United States Patent [19]

Scholz et al.

[11] Patent Number: 4,645,901
[45] Date of Patent: Feb. 24, 1987

[54] APPARATUS FOR AUTOMATIC CHANGING OF WELDING TORCHES IN AN INDUSTRIAL ROBOT WELDING SYSTEM

[75] Inventors: Wolfgang Scholz, Horb/Nordstetten; Herbert Gzik, Stuttgart; Hans J. Scholz, Ostilderm; Hubert Flaig, Stuttgart, all of Fed. Rep. of Germany

[73] Assignee: Fraunhofer-Gesellschaft zur Förderung der angewandten Forschung e.v., Fed. Rep. of Germany

[21] Appl. No.: 745,179

[22] Filed: Jun. 17, 1985

[51] Int. Cl.⁴ .................................................. B23K 9/00
[52] U.S. Cl. ................................. 219/125.1; 219/136; 219/137.2; 219/137.63; 901/42
[58] Field of Search ................ 219/125.1, 124.34, 136, 219/137.2, 137.63; 901/42

[56] References Cited

U.S. PATENT DOCUMENTS 3,847,287 11/1974 Dinse .................................... 219/136
4,420,674 12/1983 Jordan .............................. 219/125.1
4,492,847 1/1985 Masaki et al. .................. 219/124.34
4,514,616 4/1985 Warner ................................ 219/136

FOREIGN PATENT DOCUMENTS 2730511 9/1978 Fed. Rep. of Germany.
3202886 8/1982 Fed. Rep. of Germany.

OTHER PUBLICATIONS

Wellinger et al, "Schweissen", 1964, pp. 56–57.

Primary Examiner—Clifford C. Shaw
Attorney, Agent, or Firm—Jones, Tullar & Cooper

[57] ABSTRACT

An apparatus for automatic changing of welding torches in an industrial robot welding system, in particular for fusion welding, comprising an industrial robot, at least one welding torch having an insert and a handle, a source of welding current, a hose assembly, a wire feed device and an interface. The interface is located between the handle and insert and has associated therewith a coupling for supplying welding wire and electrical current, a coupling for a coolant supply line, a coupling for a coolant return line and a coupling for supplying shielding gas.

7 Claims, 5 Drawing Figures

APPARATUS FOR AUTOMATIC CHANGING OF WELDING TORCHES IN AN INDUSTRIAL ROBOT WELDING SYSTEM

TECHNICAL FIELD

The invention relates to an apparatus for automatic changing of welding torches in an industrial robot welding system, in particular for fusion welding, which comprises an industrial robot, a source of welding current with a hose assembly, at least one welding torch, an interface for separating the welding torch and the industrial robot, a wire feed device, a place where the welding torches can be set aside, and a guide for the welding wire.

BACKGROUND OF THE INVENTION

Automatic changing of a welding torch, or parts thereof, in an industrial robot welding system should assure fully automatic operation even if there are frequent disruptions at the welding torches.

It is known that in order to meet this need, tool changing devices which are capable of changing a plurality of identical or different welding torches (as well as other tools) can be used. It is also known that in this arrangement (see the journal VDI-Z [Journal of the Association of German Engineers] 125 (1983), No. 7, Apr. (I), pages 223-225), not only the entire welding torch but also the hose assembly, and thus as a rule the electrical current source as well, must all be changed.

In most cases, for reasons of economy, the necessity of having to exchange the entire welding torch and hose assembly in the event of a partial disruption at only one or a few functional parts of the welding torch (such as the wire nozzle or the gas nozzle) hinders the realization of an exchange of the welding torch. Similarly, attaching the wire feed device to the upper arm of the industrial robot, which is otherwise favorable, has not been possible in previously realized changing equipment.

SUMMARY OF THE INVENTION

It is accordingly an object of the invention to make it technologically simpler and less expensive to change welding torches, and also to enable the exchange of individual functional parts of the welding torch.

This object is attained in accordance with the invention by the provision of an interface for each welding torch of the industrial robot system which is located within the welding torch and separates the welding torch and the industrial robot. Preferably, the interface is located between the welding torch handle and the welding torch insert. A coupling for supplying welding wire and electrical current, a coupling for a coolant supply line, a coupling for a coolant return line and a coupling for supplying shielding gas are provided at the interface.

The invention is substantially based on the following structural improvements:

the functional parts of the welding torch are embodied with couplings;

a wire cutting mechanism is built into the welding torch; and magazine and supply devices for the functional parts of the welding torch are integrated.

The advantages attained with the invention are in particular that when only one source of electrical current, one wire feed device and one hose assembly are present, an automatic exchange of the welding torch is possible. It is also possible, in order to reduce effort and expense, to change only individual defective or soiled functional parts automatically, instead of the entire welding torch. The most favorable manner of effecting the exchange at a given time can be automatically determined, for instance via appropriate signals from the industrial robot control system.

In addition to the above advantages, it is at the same time possible to attach the wire feed device optimally to the upper arm of the industrial robot; as a result, with a short hose assembly, the utility of the system is increased still further.

The invention will become more apparent from the ensuing detailed description of an exemplary embodiment, taken in conjunction with the drawings.

DESCRIPTION OF THE PREFERRED EMBODIMENT

Figure 1:
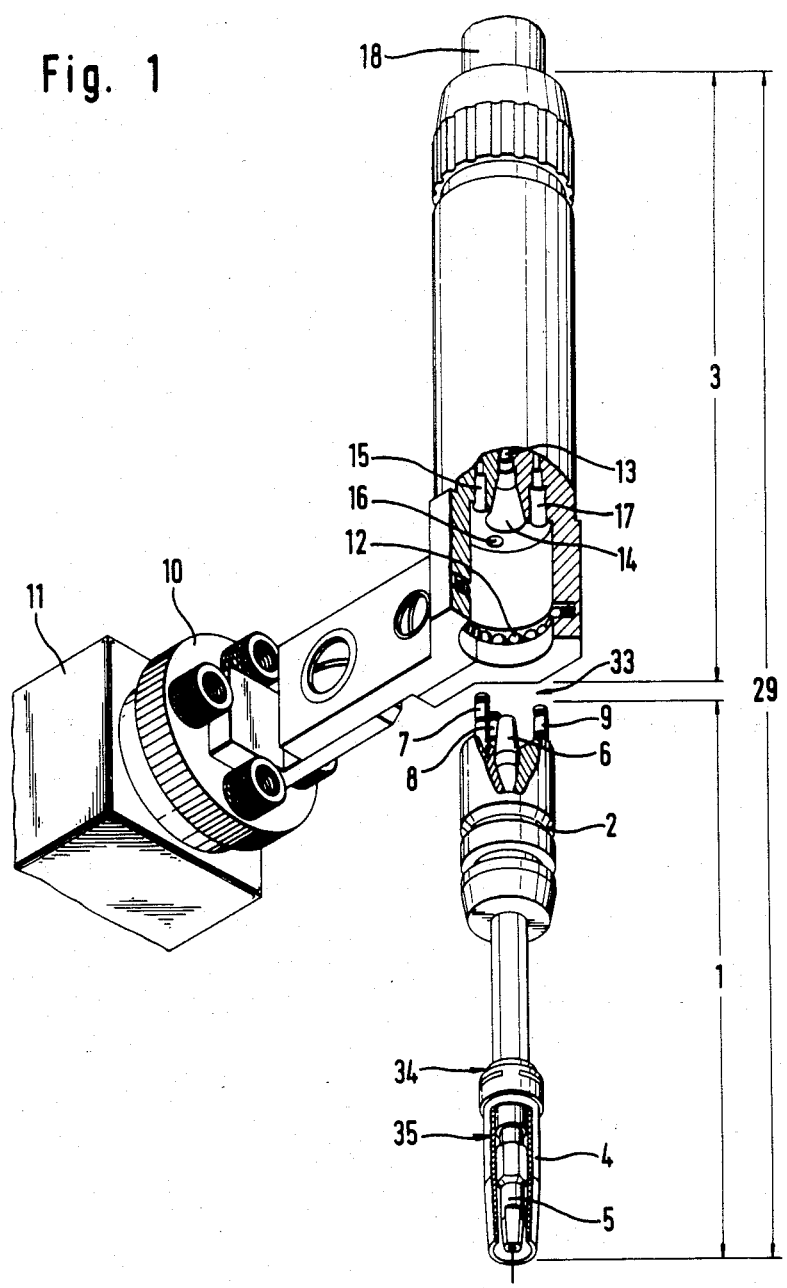
FIG. 1 shows a welding torch having automatically changeable functional parts.

FIG. 1 shows the industrial robot welding system in terms of its most important individual components. Included is a welding torch insert 1 and a welding torch handle 3. The welding torch insert 1 has a groove 2 for retaining the welding torch insert 1 in the welding torch handle 3. The welding torch insert 1 further has a gas nozzle 4, a wire nozzle 5, a coupling 6, embodied as a centering ball for a welding wire and electrical current supply; as well as conventional couplings for a coolant supply line 7, a coolant return line 8, and a conventional coupling 9 for supplying shielding gas. With these functional elements, the welding torch insert 1 fits into the welding torch handle 3, which is secured via a flange 10 to the industrial robot 11. The welding torch handle 3 has spring-loaded balls 12 for centering and fixing the welding torch insert 1, a welding wire guide 13, a centering cone 14 for the welding wire and electrical current supply, a coolant supply line 15, a coolant return line 16 and a shielding gas supply line 17. Discharging into the welding torch handle 3 is a hose assembly 18, which leads from the shielding gas welding unit.

The welding torch 29 is provided with various interfaces: an interface 33 separates the welding torch insert 1 from the welding torch handle 3; an interface 34 separates the gas nozzle 4 from the couplings associated with the interface 33; and an interface 35 separates the wire nozzle 5 from the couplings associated with the interface 33.

The process of severing the wire will now be described, with reference to FIG. 2:

When the welding torch insert 1' and the welding torch handle 3' are taken apart, all the couplings are disconnected and the lines that are under pressure are closed. In this process, the spring-loaded balls 12' for centering and fixing the welding torch insert 1' are pressed out of the groove 2' of the welding torch insert 1', as is a cutting lever 22' loaded by a return spring 21' and intended for actuating the wire cutting mechanism. The wire cutter 24' is moved in the horizontal direction, and the welding wire 25' is severed at the centering cone 14' for the welding wire and electrical current supply means. When a new welding torch insert is inserted, the cutting lever 22' snaps into place in the groove 2' and the wire cutter 24' releases the welding wire 25'.

Figure 3:
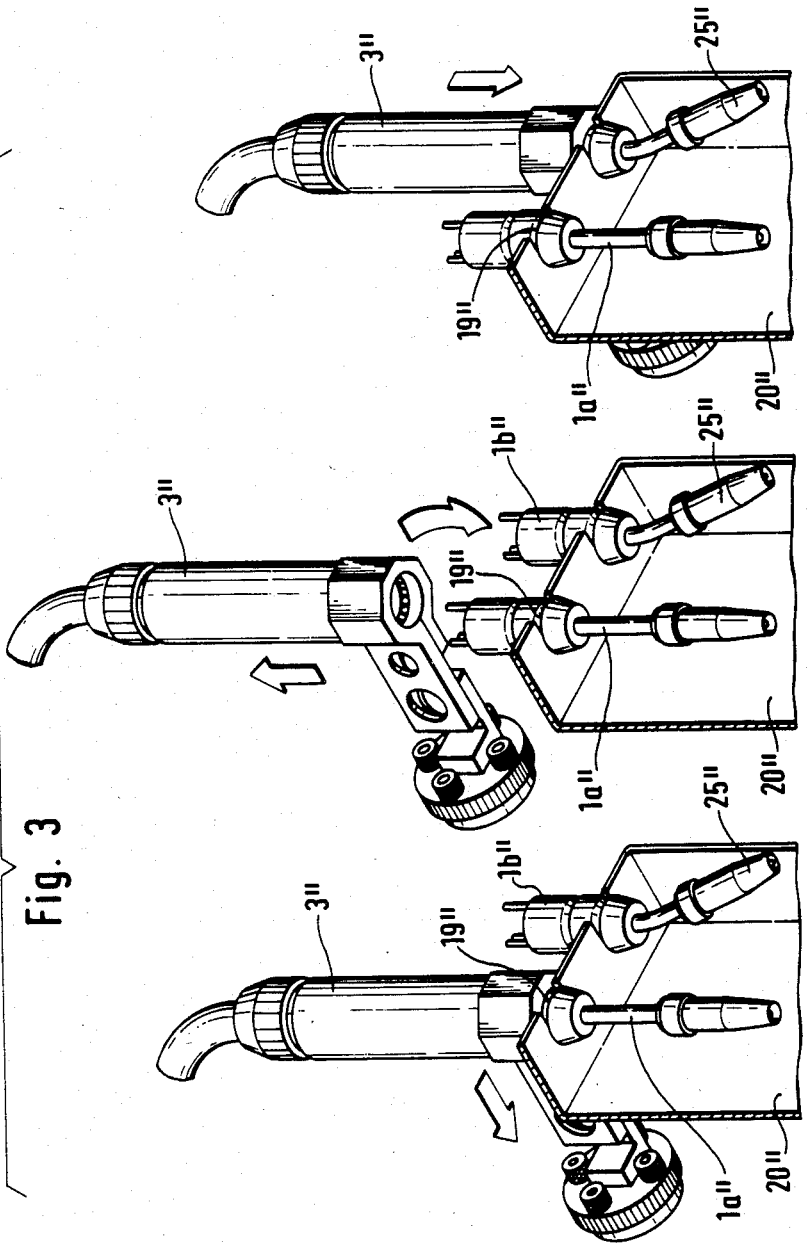
FIG. 3 illustrates the sequence of an automatic welding torch exchange.

The process of changing the welding torch insert will now be described, with reference to FIG. 3:

The welding torch insert 1a'' is inserted with a groove 19'' into an available space in the torch magazine 20''. By means of a vertical upward movement of the welding torch handle 3'', all the couplings are disconnected and the lines that are under pressure are closed. The wire cutting process takes place as described in conjunction with FIG. 2. The welding torch handle 3'', which is now free, is positioned above the desired welding torch insert 1b'' in the torch magazine 20'' and is coupled with it by means of a downward vertical movement. The removal of the now-inserted welding torch insert 1b'' from the torch magazine 20'' is effected in the horizontal direction. Welding can continue after a predetermined advancement of the welding wire 25''.

Figure 4:
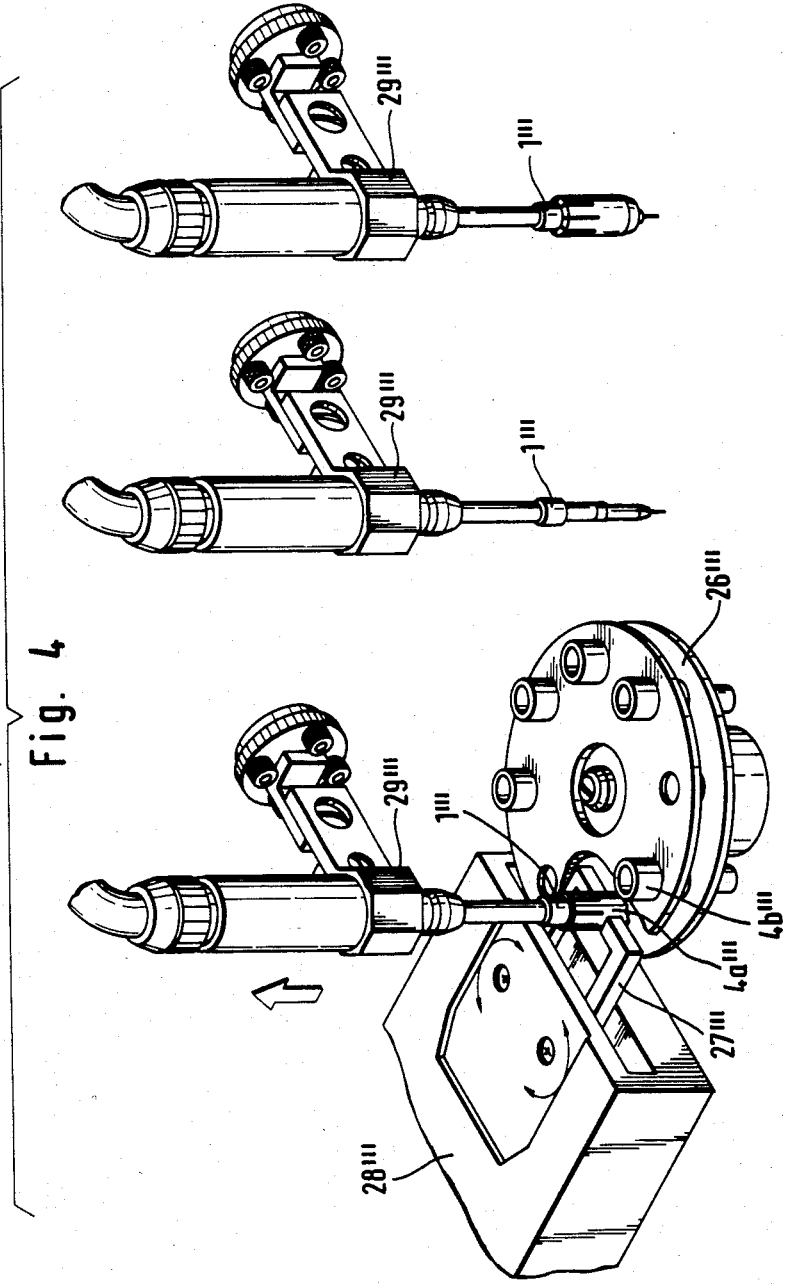
FIG. 4 illustrates the sequence of an automatic gas nozzle exchange.

If only the gas nozzle of the welding torch insert is to be changed, because it is soiled or to gain better access, then the procedure can take the course shown in FIG. 4:

The gas nozzle 4a''' is inserted through a free space in the gas nozzle magazine 26''' between gripper jaws 27''' of a removing tool 28'''. By closing the gripper jaws 27''', the gas nozzle 4a''' that is to be removed is firmly held by the gripper jaws 27'''. As the welding torch 29''' is moved upward, the gas nozzle 4a''' is removed from the welding torch insert 1''' (the holding force between the gas nozzle and the welding torch insert is less than the holding force between the welding torch insert and the welding torch handle). The gas nozzle 4a''' that has now been removed drops into the gas nozzle magazine 26''' once the gas nozzle gripper jaws 27''' have been opened. The gas nozzle magazine 26''' is indexed further until such time as a gas nozzle 4b''' that is to be inserted is located beneath the welding torch 29'''. By moving the welding torch 29''' into the gas nozzle 4b''', the nozzle is clamped and held, so that the welding torch 29''' with the new gas nozzle 4b''' clamped to it can move upward once again. The process of changing the gas nozzle is thereby complete.

Figure 2:
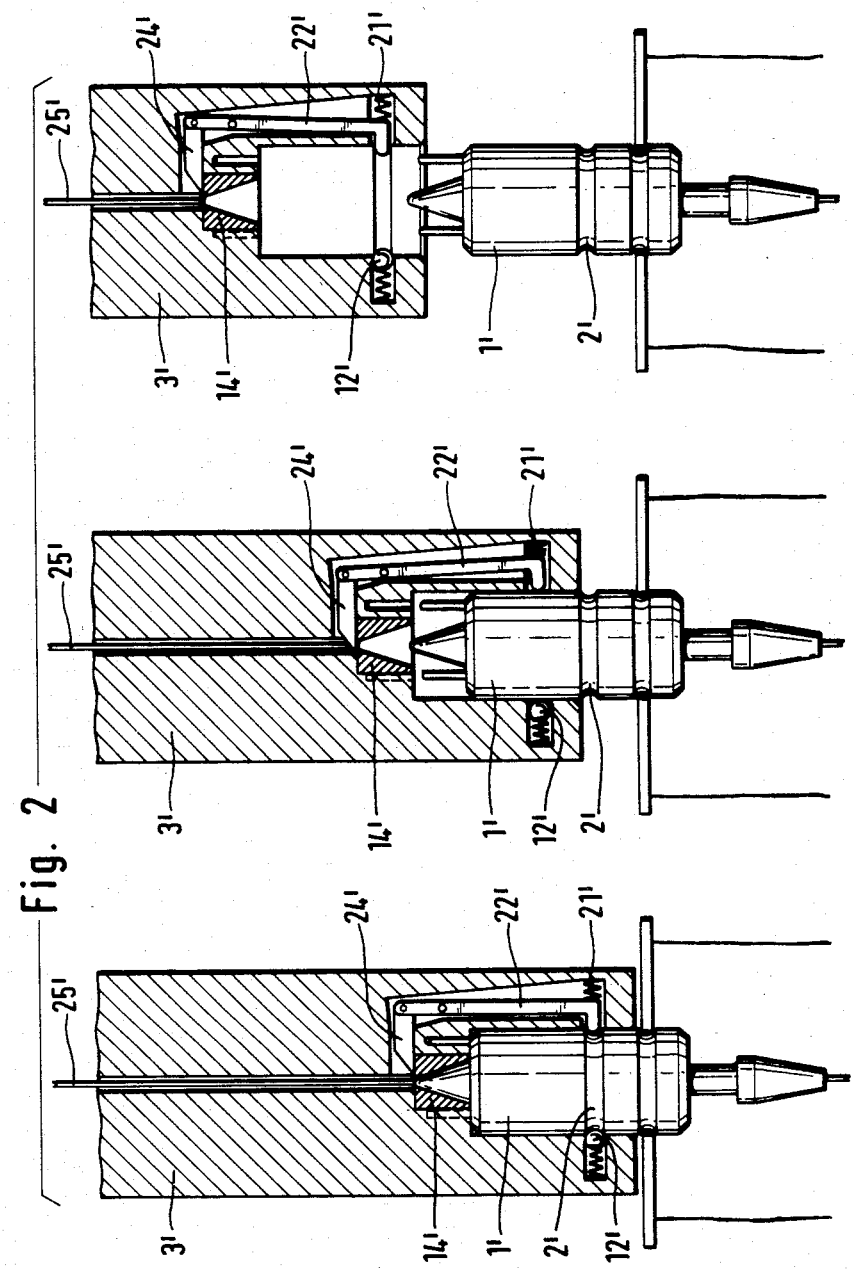
FIG. 2 illustrates the basic procedure for severing the welding wire.
Figure 5:
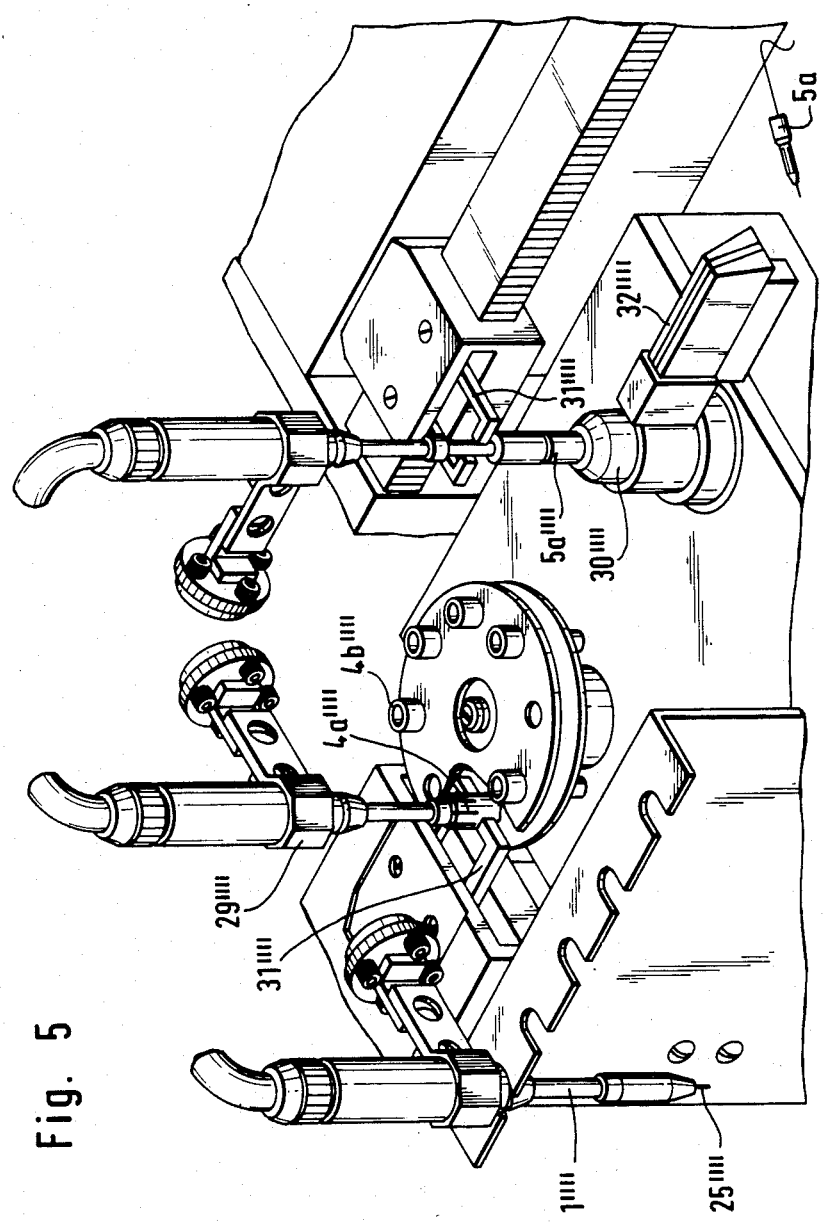
FIG. 5 illustrates the sequence of an automatic wire nozzle exchange.

Wire nozzle soiling or disruption, which occurs frequently, can be overcome by changing the wire nozzle, as shown in FIG. 5:

The procedure begins with the severing of the welding wire 25'''' by disconnecting the welding torch insert 1'''' as described in FIG. 2, which activates the wire cutting mechanism. The disconnected welding torch insert 1'''' is reinserted immediately after the cutting process. Then the gas nozzle 4a'''' is unclamped as shown in FIG. 4, and the welding torch 29'''', now lacking the gas nozzle 4a'''', is positioned above a screw drive 30''''. After the wire nozzle 5a'''' is inserted into the screw drive 30'''', the wire nozzle 5a'''' is unscrewed. A pair of wire nozzle gripper jaws 31'''' firmly hold the free end of the unscrewed wire nozzle 5a'''', after which the welding torch 29'''' is moved upward, while the welding wire 25'' is simultaneously advanced. Once the severed welding wire 25'''' is out of the welding torch 29'''' and the wire nozzle gripper jaws 31'''' are released again, a new wire nozzle 5b'''' from the wire nozzle magazine 32'''' is inserted into the screw drive 30'''' and pressed upward, so that the old wire nozzle 5a'''' falls out. The welding torch 29'''' is inserted into the new wire nozzle 5b'''', after which the screw drive 30'''' can screw the wire nozzle into place. The new or old gas nozzle 4a'''' (4b'''') is clamped as described in conjunction with FIG. 3. The entire process of changing the wire nozzle is now complete.

There are various possibilities for realizing fully automatic industrial robot welding with an automatically exchangeable welding torch. Either the welding torch insert, the gas nozzle or the wire nozzle is exchanged cyclically at particular time intervals arrived at by trial and error (the cycles being programmed into the robot control system), or else sensors for detecting disruptions must be present, which then initiate an appropriate strategy (e.g., changing a welding torch, gas nozzle or wire nozzle). Such sensors ascertain, for instance, whether the welding wire is being fed as programmed (otherwise the wire becomes stuck in the wire nozzle, so that an exchange of the wire nozzle or of the welding torch must be initiated), which can be realized using commercially available wire feed measuring equipment; or whether the shielding gas is being fed as programmed (otherwise, the gas nozzle becomes clogged with spatters, so that an exchange of the gas nozzle or of the welding torch must be initiated), which can be realized using commercially available shielding gas feed flow measuring equipment.

We claim:

1. An apparatus for automatic changing of welding torches in an industrial robot welding system, comprising:
    an industrial robot;
    at least one welding torch connected to the industrial robot;
    each welding torch including a handle and an insert;
    a source of welding current connected to each welding torch;
    a hose assembly connected to each welding torch;
    a surface for setting the welding torches aside;
    a welding wire feed device for each welding torch for feeding welding wire through the welding torch;
    a guide for the welding wire;
    an interface situated in each welding torch for separating the welding torch handle from the welding torch insert, said interface having associated therewith a coupling for supplying welding wire and electrical current, a coupling for a coolant supply line, a coupling for a coolant return line and a coupling for supplying shielding gas; and
    a wire cutting mechanism including a cutting lever, a wire cutter connected to the cutting lever and situated adjacent to the wire, and a return spring connected for biasing the cutting lever, which, upon separation of the welding torch handle, automatically severs the welding wire.

2. The apparatus as defined in claim 1, wherein the wire feed device includes a wire feed nozzle, said apparatus further comprising:
    a further interface for separating the wire feed nozzle from the couplings associated with said interface.

3. The apparatus as defined in claim 1, further comprising:
    a gas nozzle connected to each welding torch; and a further interface for separating the gas nozzle from the couplings associated with said interface.

4. The apparatus as defined in claim 3, wherein the wire feed device includes a wire feed nozzle, said apparatus further comprising:

a still further interface for separating the wire feed nozzle from the couplings associated with said interface.

5. A welding torch for an industrial robot welding system, comprising:

a welding torch handle;
a welding torch insert connected to said welding torch handle;
a source of welding current connected to the welding torch insert;
a hose assembly connected to the welding torch handle;
a welding wire feed device situated in said welding torch handle and said welding torch insert for feeding welding wire to the welding torch;
an interface between the welding torch handle and the welding torch insert having associated therewith a coupling for supplying welding wire and electrical current to the welding torch insert from the welding torch handle, a coupling for a coolant supply line, a coupling for a coolant return line and a coupling for supplying shielding gas; and
a wire cutting mechanism including a cutting lever, a wire cutter connected to the cutting lever and situated adjacent to the wire, and a return spring connected for biasing the cutting lever, which, upon separation of the welding torch handle, automatically severs the welding wire.

6. An apparatus for automatic changing of welding torches in an industrial robot welding system, comprising:

an industrial robot;
at least one welding torch connected to the industrial robot;
each welding torch including a handle and an insert;
a source of welding current connected to each welding torch;
a hose assembly connected to each welding torch;
a surface for setting the welding torches aside;
a welding wire feed device for each welding torch for feeding welding wire through the welding torch, said wire feed device including a wire feed nozzle;
a guide for the welding wire;
an interface situated in each welding torch for separating the welding torch handle from the welding torch insert, said interface having associated therewith a coupling for supplying welding wire and electrical current, a coupling for a coolant supply line, a coupling for a coolant return line and for supplying shielding gas;
a further interface for separating the wire feed nozzle from the couplings associated with said interface; and
a wire cutting mechanism including a cutting lever, a wire cutter connected to the cutting lever and situated adjacent to the wire, and a return spring connected for biasing the cutting lever, which, upon separation of the welding torch handle, automatically severs the welding wire.

7. An apparatus for automatic changing of welding torches in an industrial robot welding system, comprising:

an industrial robot;
at least one welding torch connected to the industrial robot;
each welding torch including a handle and an insert;
a source of welding current connected to each welding torch;
a hose assembly connected to each welding torch;
a surface for setting the welding torches aside;
a welding wire feed device for each welding torch for feeding welding wire through the welding torch;
a guide for the welding wire;
an interface situated in each welding torch for separating the welding torch handle from the welding torch insert, said interface having associated therewith a coupling for supplying welding wire and electrical current, a coupling for a coolant supply line, a coupling for a coolant return line and a coupling for supplying shielding gas;
a gas nozzle connected to each welding torch;
a further interface for separating the gas nozzle from the couplings associated with said interface; and
a wire cutting mechanism including a cutting lever, a wire cutter connected to the cutting lever and situated adjacent to the wire, and a return spring connected for biasing the cutting lever, which, upon separation of the welding torch handle, automatically severs the welding wire.

* * * * *